Nov. 14, 1967  H. D. HULTERSTRUM  3,352,340
FOOD PROCESSING DEVICE
Filed June 4, 1965
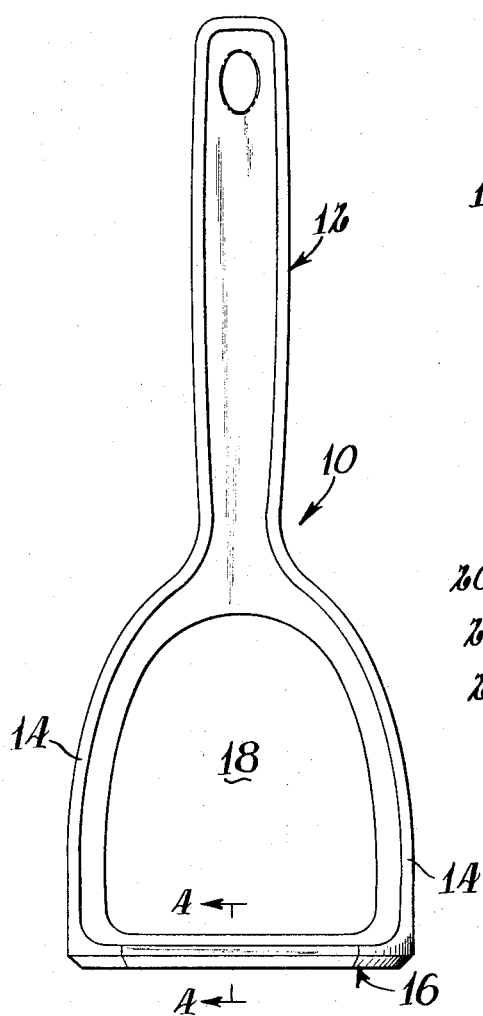
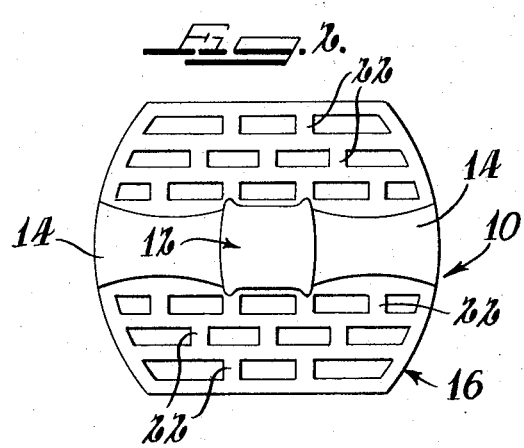
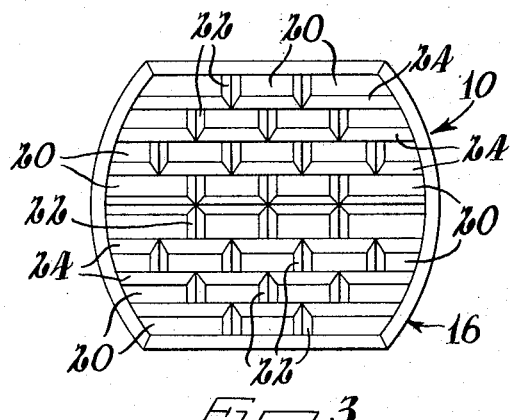
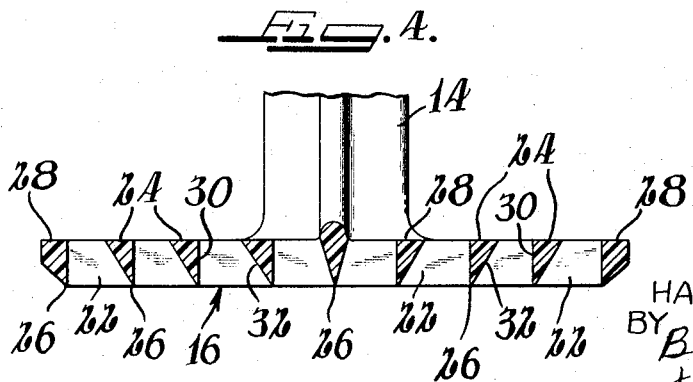
INVENTOR
HAROLD D. HULTERSTRUM
BY Baio, Freeman
& Molinare
Attys.

United States Patent Office 3,352,340
Patented Nov. 14, 1967

3,352,340
FOOD PROCESSING DEVICE
Harold D. Hulterstrum, Baraboo, Wis., assignor to Flambeau Plastics Corporation, Baraboo, Wis., a corporation of Wisconsin
Filed June 4, 1965, Ser. No. 461,299
1 Claim. (Cl. 146—213)

ABSTRACT OF THE DISCLOSURE

An improved potato masher. The potato masher has a base with a central portion and opposite side portions. An upright handle is unitary with the base and is secured to the central portion. Apertures are defined in each of the side portions and substantially upright walls separate the apertures from each other. Knife-like lower edges are provided on said upright walls and the apertures have a restricted upper end. Each of the apertures is slanted upwardly and laterally of the central portion so that food being processed is directed laterally and away from the central portion and from the handle.

---

This invention relates to an improved food processing device, such as a potato masher, which effects a mashing or cutting action on food so as to reduce the food to a pulpy mass.

Potato masher type devices have been known for many years wherein such known devices have all been constructed to perform a crushing or mashing type of action on the food being processed. This type of processing has not been completely satisfactory for a number of reasons since the processed food, for example, often has lumps of food remaining therein. Such devices also have the disadvantage that the processed food clogs the device and makes it necessary for the user to remove the processed material from the device before proceeding with its use.

It is therefore an object of this invention to provide an improved potato masher like device which substantially avoids the problems associated with prior art devices.

It is also an object of this invention to provide an improved potato masher type device wherein a cutting action is provided on the food being processed, rather than a crushing action, and wherein the device is designed to substantially avoid clogging of food on the device.

It is a further object of this invention to provide an improved potato masher type device which is integrally formed of a rigid molded plastic material and which is highly economical and simple in manufacture and construction.

Further purposes and objects of this invention will appear as the specification proceeds.

A particular embodiment of the present invention is illustrated in the accompanying drawings wherein:

FIGURE 1 is a front elevational view of my improved potato masher type device;

FIGURE 2 is a top plan view of the device of FIGURE 1;

FIGURE 3 is a bottom plan view of the device of FIGURE 1; and

FIGURE 4 is an enlarged, sectional view, taken along the line 4—4 of FIGURE 1.

Referring to the drawings, my improved food processing or potato masher type device 10 includes an integral handle 12, a pair of integral downwardly extending arcuate arms 14 which connect the handle 12 to an integral base or operating portion 16. The processing device 10, for purposes of simplicity and economy of construction and manufacture, is preferably made by being molded of a rigid plastic material, such as nylon, so as to provide an integral device 10.

The handle 12, together with the outwardly and downwardly curved arms 14, define an enlarged upright opening 18 above the central portion of the base 16. The two arms 14 are integrally connected to the opposite ends of the central portion of the base 16 and provide for a rigid connection therebetween. Side portions are defined on opposite sides of the central portion.

The base or operating portion 16 is substantially flat in shape having a plurality of apertures 20 formed therein, the axes of the apertures being substantially parallel to the handle 12. As seen best in FIGURES 2 and 3, the apertures provided are substantially rectangular in cross-section and are separated by transverse walls 22 and longitudinal walls 24 which walls intersect to define the apertures. The apertures 20 permit the passage of the processed food material upwardly therethrough.

In my invention, it is important that the lower edge or bottom of each wall 22 and 24 is to define a knife-like edge 26 in order to provide a cutting action rather than a mashing or crushing action, such as provided by all known prior art devices. The cutting action provided by my improved device provides a highly efficient processing of the food being processed. The knife-like edges also facilitate the operation of the device since it meets less resistance during use.

Of further importance in the construction of my device, the upper ends 28 of each of the walls 22 and 24 are widened so that the apertures 20 have a widened lower end and a restricted upper end. In the important detailed construction of the longitudinal walls, referring particularly to FIGURE 4, each longitudinal wall 24 includes a substantially upright surface 30 and an upwardly and outwardly slanted surface 32 whereby each aperture 20 is defined by an upright surface 30 and an opposite slanted surface 32. Since the slanted surface 32 is directed outwardly and away from the central portion of the base 16, the processed or mashed food is directed laterally away from the central portion and thus away from the vertical upright aperture 18. This unique construction thus cooperates in affording a highly efficient device which avoids clogging of food and provides a highly efficient processing of food into a pulpy mass.

While in the foregoing there has been provided a detailed description of a particular embodiment of the present invention, it is to be understood that all equivalents obvious to those having skill in the art are to be included within the scope of the invention as claimed.

What I claim and desire to secure by Letters Patent is:

An improved potato masher type food processing device comprising a base having a central portion and opposite side portions, an upright handle unitary with said base and being affixed to said central portion, apertures defined in said side portions, substantially upright walls defining and separating said apertures, and knife-like lower edges on each of said upright walls, said apertures having a restricted upper end portion, and said apertures also being slanted upwardly and laterally of said central portion so that said food is directed laterally and away from said central portion and from said handle.

References Cited

UNITED STATES PATENTS

| 50,724 | 10/1865 | McNiel | 146—213 |
| 1,789,929 | 1/1931 | Guth | 146—213 |
| 1,800,653 | 4/1931 | Morris | 146—213 |

FOREIGN PATENTS

| 817,801 | 5/1937 | France. |
| 613,700 | 12/1948 | Great Britain. |

W. GRAYDON ABERCROMBIE, *Primary Examiner.*